United States Patent
Sugino et al.

[11] Patent Number: 5,927,429
[45] Date of Patent: Jul. 27, 1999

[54] ELECTRIC POWER STEERING APPARATUS

[75] Inventors: Mitsutaka Sugino; Hiroshi Ichimura; Masahiro Ogawa; Tsuto Sasaki; Tetsuya Matsumoto; Tsutomu Tatsuishi, all of Wako, Japan

[73] Assignee: Honda Giken Kogyo Kabushiki Kaisha, Tokyo, Japan

[21] Appl. No.: 09/090,692

[22] Filed: Jun. 5, 1998

[30] Foreign Application Priority Data

Jun. 25, 1997 [JP] Japan ........................... 9-169112

[51] Int. Cl.⁶ ............................................. B62D 5/04
[52] U.S. Cl. ............................................. 180/444
[58] Field of Search .................... 180/443, 444, 180/446

[56] References Cited

U.S. PATENT DOCUMENTS

| Re. 32,222 | 8/1986 | Drutchas | 180/444 |
|---|---|---|---|
| 4,715,461 | 12/1987 | Shimizu | 180/446 |
| 4,727,950 | 3/1988 | Shimizu et al. | 180/446 |
| 4,766,970 | 8/1988 | Shimizu | 180/444 |
| 4,771,843 | 9/1988 | Shimizu | 180/446 |
| 4,773,497 | 9/1988 | Carlson et al. | 180/444 |
| 4,834,202 | 5/1989 | Shimizu | 180/444 |
| 5,299,469 | 4/1994 | Sano et al. | 180/444 |

FOREIGN PATENT DOCUMENTS 7-165089 6/1995 Japan .

*Primary Examiner*—Kevin Hurley
*Assistant Examiner*—William R. Zimmerli
*Attorney, Agent, or Firm*—Merchant, Gould, Smith, Edell, Welter & Schmidt, P.A.

[57] ABSTRACT

An electric power steering apparatus for applying an auxiliary torque generated in proportion to a steering torque, to a rack shaft to thereby reduce the steering torque. The rack shaft has at one end thereof rack teeth for meshing with a pinion. A rack guide mechanism is provided at the rack shaft one end oppositely from the rack teeth, for urging the rack shaft to the pinion. At the other end of the rack shaft, a screw portion and a ball screw mechanism are provided. A bush is provided for supporting an intermediate portion of the rack shaft to thereby restrict the bending of the intermediate portion beyond a predetermined value when an external force is applied to the rack shaft ends thereby bending the rack shaft intermediate portion. As a result, the vibration of the rack shaft and hence a steering wheel can be minimized.

2 Claims, 8 Drawing Sheets

ELECTRIC POWER STEERING APPARATUS

BACKGROUND OF THE INVENTION

1. Field of the Invention

The present invention relates to an improvement in an electric power steering apparatus carried on a vehicle.

2. Description of the Related Art

In recent years, electric power steering apparatuses have been widely used to provide a comfortable steering feel to a driver by reducing the manual steering effort or force needed to turn a steering wheel. These electric power steering apparatuses are constructed such that an auxiliary torque generated by an electric motor in proportion to a steering torque is transmitted to a steering system. One example of such electric power steering apparatuses is disclosed in Japanese Patent Laid-Open Publication No. HEI 7-165089 entitled "Electric Power Steering Apparatus".

The electric power steering apparatus disclosed in Japanese Patent Laid-Open Publication No. HEI 7-165089 includes a rack shaft having a ball nut mechanism assembled with one end portion thereof, a rack provided at the other end portion thereof, and a pinion meshing with the rack. The electric power steering apparatus also includes a rack guide for urging the rack shaft against the pinion, which rack guide is disposed at a position where the pinion meshes with the rack, thereby eliminating a play at the meshed portion.

Reference is now made to (a) to (d) of FIG. 8 hereof, which diagrammatically illustrate the electric power steering apparatus disclosed in Japanese Patent Laid-Open Publication No. HEI 7-165089.

(a) of FIG. 8 diagrammatically illustrates in top plan the electric power steering apparatus. As shown in this figure, the steering apparatus 100 comprises a rack shaft 101 with steered wheels 104, 104 connected to opposite ends thereof via tie rods 102, 102 and knuckle arms 103, 103. A ball nut mechanism 105 is assembled at one end of the rack shaft 101. A rack 106 is provided at the other end of the rack shaft 101. A pinion 107 is in meshing engagement with the rack 106. The rack shaft 101 is pressed against the pinion 107 by a rack guide 108 located oppositely from the pinion 107.

(b) of FIG. 8 is a separate diagrammatic illustration of the rack shaft 101 and associated members shown in (a) of FIG. 8. As shown in this figure, the rack shaft 101 is supported at two different points, namely, at a position where the ball nut mechanism 105 is disposed and at a position where the pinion 107 and the rack guide 108 are provided. Thus, the rack shaft 101 has a long support span, that is, it is supported at two different points of support spaced apart a long distance.

(c) and (d) of FIG. 8 diagrammatically illustrate operations of the rack shaft 101 and associated members shown in (b) of FIG. 8. As can be seen from these figures, a road surface reactive force is transmitted to the rack shaft 101 via the tie rods 102, 102 during running of a vehicle, particularly upon turning of a steering wheel. Thus, an external force or moment (hereinafter called "moment M") resulting from the road surface reactive force is applied to the opposite ends of the rack shaft 101. Consequently, the rack shaft 101 bends in a lengthwise direction of the vehicle as shown by a solid line. The long support span described above adds up the amount of such bending.

Generally, in the electric power steering apparatus of FIG. 8, there exists an error of meshing dimension between the rack 106 and pinion 107. Further, a clearance arises between screw grooves and balls of the ball nut mechanism 105. The rack shaft 101 thus encounters vibrations resulting from the causes as enumerated below:

(a) during running of the vehicle, especially when the steering wheel is turned, a road surface reactive force is transmitted to the rack shaft 101 via the tie rods 102, 102, thereby vibrating the rack shaft 101 in a front-and-rear direction of the vehicle (first cause); and (b) as each ball of the ball nut mechanism 105 comes into and out of contact with the respective screw groove, a force applied from the ball to the screw groove varies, thereby vibrating the rack shaft 101 (second cause).

When a frequency of the vibration resulted from the first cause and a frequency of the vibration resulted from the second cause match, the vibration of the rack shaft 101 is amplified. Further, when the frequency of the amplified vibration matches with the natural frequency of the rack shaft 101, the rack shaft 101 vibrates in a further increased magnitude due to resonance.

Such amplified vibration of the rack shaft 101 may be transmitted to the passenger compartment via the steering wheel, thereby producing noises in the passenger compartment. Transmission of the rack shaft vibration to the steering wheel is also undesired from the standpoint of a steering feel to the driver.

As measures to suppress the resonance of the rack shaft 101, one ay propose (1)–(3) as follows:

(1) to increase the accuracy of meshing dimension of the rack 106 and the pinion 107;

(2) to reduce the clearance between the ball and the screw groove of the ball nut mechanism 105; and/or (3) to alter the diameter of the rack shaft 101 to thereby vary its natural frequency, or to provide the rack shaft 101 with a vibration restricting member.

However, the measure (1) involves tedious processing, thereby increasing the costs of the resulting products. The measure (2) results in an increased frictional resistance between the ball and the screw groove and hence is undesired from the aspect of a steering feel. With the measure (3), the rack shaft 101 is increased in weight and complicated in construction.

Thus, it is demanded that an electric power steering apparatus be provided in which measures against the vibration of the rack shaft can be effected at low cost.

SUMMARY OF THE INVENTION

According to a first aspect of the present invention, there is provided an electric power steering apparatus which comprises a rack shaft having rack teeth disposed at a portion of a peripheral surface of one end thereof and a screw portion provided at other end thereof, a pinion for meshing with the rack teeth, a rack guide mechanism provided on a back side surface of the peripheral surface, opposed from the peripheral surface portion on which the rack teeth are formed, for pressing the back side surface of the rack shaft, a nut mounted on the screw portion, an electric motor for applying an auxiliary torque, corresponding to a steering torque, to the rack shaft through the nut, and a bush for supporting an intermediate portion of the rack shaft to thereby restrict bending of the rack shaft in excess of a predetermined value when the rack shaft is bent by the predetermined value.

When an external force or moment (hereinafter referred to as "moment") arising from a road surface reactive force is applied to both ends of the rack shaft thereby bending the intermediate portion of the rack shaft, the bush supports the rack shaft intermediate portion and restrict the bending of the same beyond the predetermined value. Since the amount of bending of the rack shaft is kept to a minimum, the vibration of the rack shaft and hence the steering wheel can be suppressed. Moreover, by preventing the vibration of the rack shaft from being transmitted to a passenger compartment through the steering wheel, noises in the passenger compartment can be reduced. Further, since provision of the bush having a simple structure prevents the vibration of the rack shaft, it becomes possible to produce an electric power steering apparatus at low cost. Still further, since the vibration of the rack shaft is reduced, it becomes possible to decrease wear of the rack-and-pinion mechanism and screw mechanism.

According to a second aspect of the present invention, there is provided an electric power steering apparatus which comprises a rack shaft having rack teeth disposed at a portion of a peripheral surface of one end thereof and a screw portion provided at a position displaced from other end toward the one end thereof, a pinion for meshing with the rack teeth, a rack guide mechanism provided on a back side surface of the peripheral surface, opposed from the peripheral surface portion on which the rack teeth are formed, for pressing the back side surface of the rack shaft, a nut mounted on the screw portion, an electric motor for applying an auxiliary torque, corresponding to a steering torque, to the rack shaft through the nut, and a bush for supporting the other end of the rack shaft to thereby restrict bending of the rack shaft in excess of a predetermined value when the rack shaft is bent by the predetermined value.

When the moment is applied to the two ends of the rack shaft thereby bending the other end of the rack shaft by the predetermined value, the bush supports the other end of the rack shaft, thereby preventing the other end from being bent beyond the predetermined value. Since the amount of bending of the other end is limited, the vibration of the rack shaft can be suppressed. This further leads to the suppression of the vibration of the steering wheel.

Moreover, according to the second aspect of the present invention, since the pinion amd rack guide are disposed at the one end of the rack shaft while the bush is disposed at the other end of the rack shaft, the ball screw can be disposed at any desired point of the intermediate portion of the rack shaft, thereby improving the freedom of disposition of the ball screw.

BRIEF DESCRIPTION OF THE DRAWINGS

Preferred embodiments of the present invention will be described below in greater detail with reference to the accompanying drawings, in which.

DETAILED DESCRIPTION OF THE PREFERRED EMBODIMENTS

Figure 1:
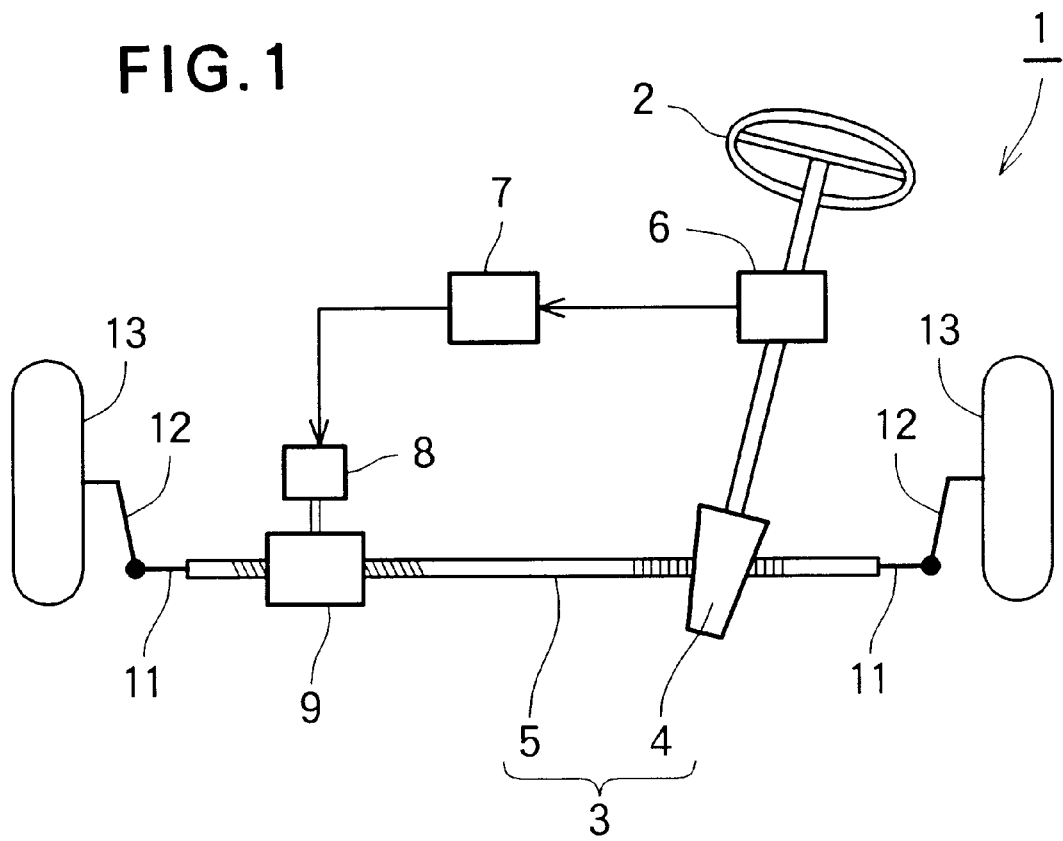
FIG. 1 is a schematic view illustrating the general arrangement of an electric power steering apparatus according to the present invention.

Referring to FIG. 1, an electric power steering apparatus 1 includes a rack-and-pinion mechanism 3 (comprised of a pinion 4 and a rack shaft 5) connected to a steering wheel 2, a torque detector 6 for detecting a steering torque generated in a steering system by turning the steering wheel 2 and outputting a signal corresponding to the detected steering torque, a control unit 7 for generating a control signal based on the signal from the torque detector 6, an electric motor 8 for generating an auxiliary torque corresponding to the steering torque based on the control signal from the control unit 7, and a ball screw 9 serving as a screw mechanism for transmitting the auxiliary torque from the electric motor 8 to the rack shaft 5. The electric power steering apparatus 1 thus constructed is operable to steer a pair of wheels 13, 13 via tie rods 11, 11 and knuckle arms 12, 12.

Figure 2:
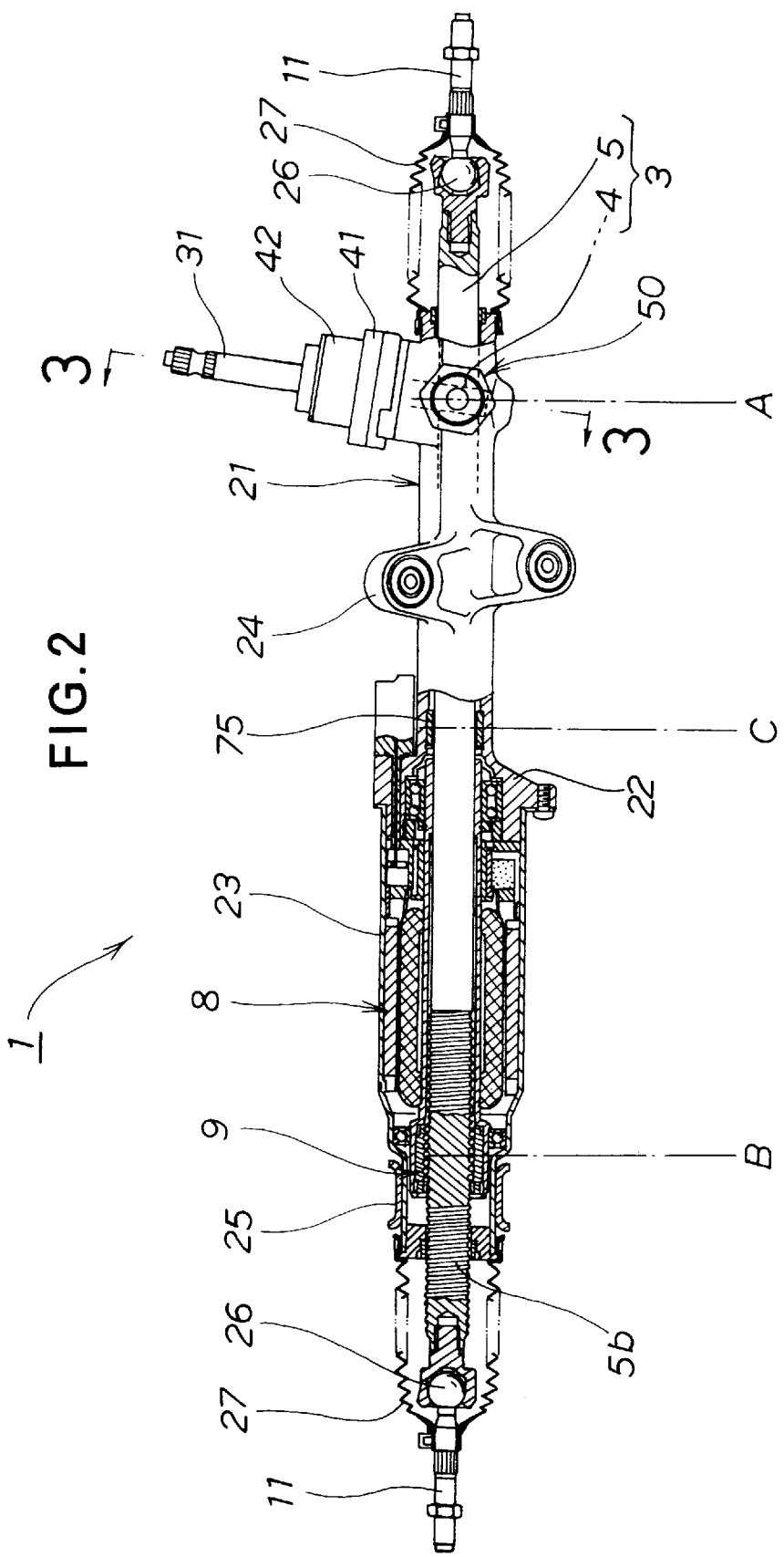
FIG. 2 is an enlarged view showing, partially in section, the construction of the electric power steering apparatus.

As shown in FIG. 2, the rack-and-pinion mechanism 3, the electric motor 8 and the ball screw 9 are accommodated within a steering gear box 21 extending transversely of a vehicle. The steering gear box 21 has generally tubular first and second housings 22, 23. The first housing 22 and the second housing 23 are bolted together. The first housing 22 has brackets 24 for connection to a vehicle body not shown. The second housing 23 has mount members 25 for connection to the vehicle body.

The rack shaft 5 extending transversely of the vehicle is meshed with the pinion 4 at a portion proximate to one end thereof and has the ball screw 9 provided at a portion proximate to an opposite end thereof. The rack shaft 5 is connected at the opposite ends to the tie rods 11, 11 and passes through the steering gear box 21 slidably along the length thereof. The steering gear box 21 has a rack guide mechanism 50 provided centrally of the position of meshing engagement between the pinion 4 and the rack shaft 5, and a bush 75 provided at an intermediate portion of the rack shaft 5. The rack-and-pinion mechanism 3 and the rack guide mechanism 50 will be described in more detail below with reference to FIG. 3. Similarly, the bush 75 will be described in detail with reference to FIG. 4.

The vehicle widthwise center of the position of meshing engagement between the pinion 4 and the rack shaft 5 is designated by reference character A (hereinafter referred to as "pinion center A"). The axial center of assemblage of the ball screw 9 with the rack shaft 5 is designated by reference character B (hereinafter referred to as "ball screw center B"). The axial center of the bush 75 is designated by reference character C (hereinafter referred to as "bush center C"). The bush center C is desirably positioned substantially centrally between the pinion center A and the ball screw center B but may be slightly displaced from the center.

Referring again to FIG. 2, reference numerals 26, 26 denote ball joints for connecting the ends of the rack shaft 5 to the tie rods 11, 11. Designated by reference numerals 27, 27 are rubber covers for covering the ball joints 26, 26.

Figure 3:
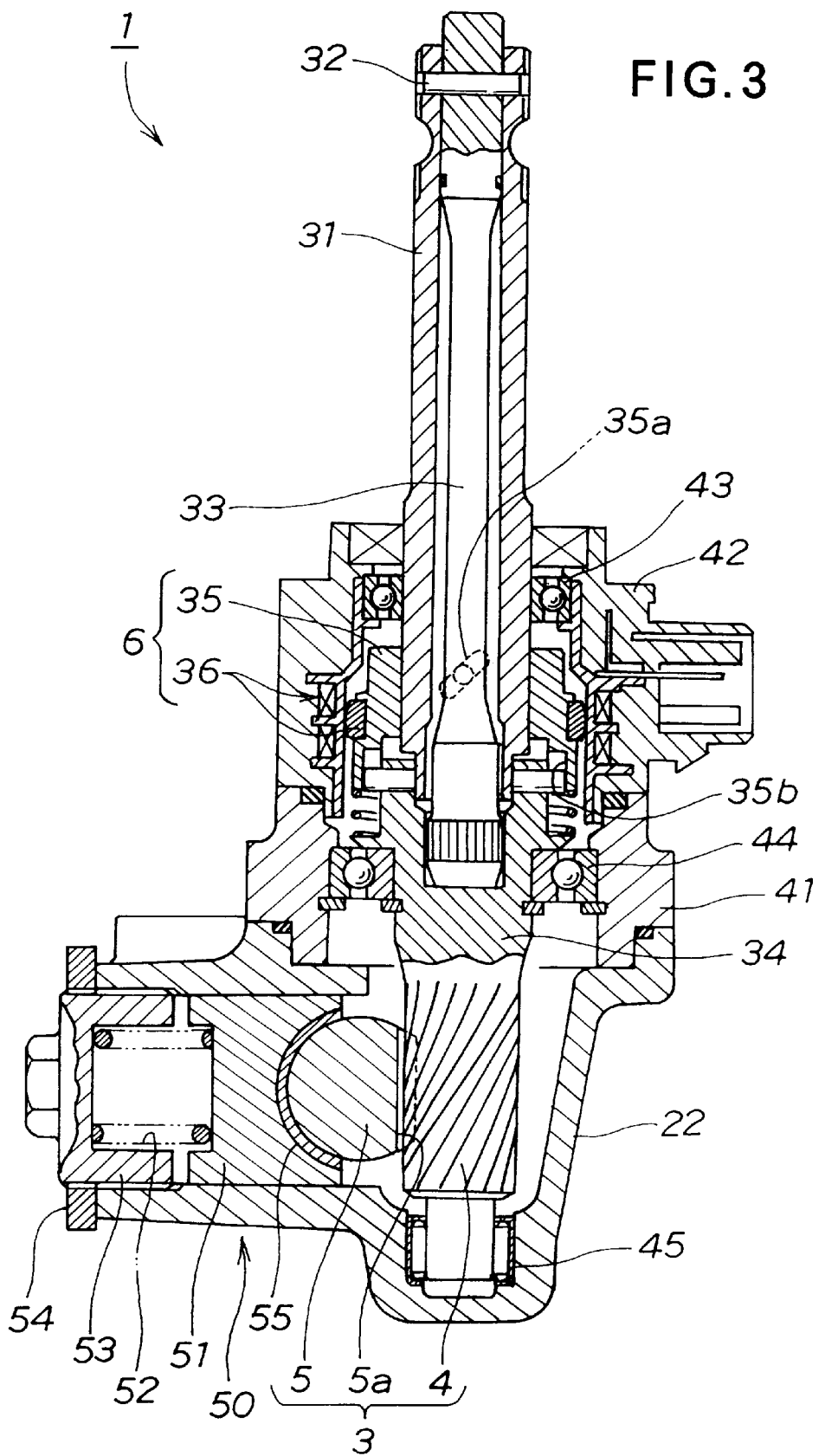
FIG. 3 is a cross-sectional view taken along line 3—3 of FIG. 2.

FIG. 3 is a cross-sectional view of the steering system. The steering system comprises a tubular input shaft 31 connected to the steering wheel 2 (see FIG. 1), a torsion (resilient) bar 33 housed in the input shaft 31 and coupled at its upper portion to the input shaft 31 by means of a pin 32, and an output shaft 34 serration coupled with a lower portion of the torsion bar 33. The output shaft 34 has the pinion 4 at a lower portion thereof.

The steering torque detector 6 detects a steering torque in the steering system by detecting a relative torsional angle between the input and output shafts 31, 34. That is, a slider 35 is displaced as the torsion bar 33 is twisted, whereupon a sensor 36, which is comprised of a magnetic material connected to the slider 35, and a coil disposed proximately thereto, detects the amount of slider displacement in the form of an amount of change in inductance, thereby detecting a steering torque.

More specifically, the torsion bar 33 is designed to produce a twist angle precisely corresponding to the steering torque, and relative torsional displacement between the input and output shafts 31, 34. The cylindrical slider 35 having an inclined groove 35a and a vertically elongated straight groove 35b is disposed between the input shaft 31 and the output shaft 34 so that the slider 35 is axially displaceable in correspondence with the relative torsional displacement. The amount of the slider displacement is proportional to the steering torque and converted into an electrical signal by the variable-inductance sensor 36.

Rack teeth 5a for meshing with the pinion 4 are formed in a part of a periphery of the rack shaft 5 extending in a front-and-rear direction of the sheet of FIG. 3. The input shaft 31, the torsion bar 33 and the output shaft 34 have the same central axis.

In FIG. 3, reference numerals 41, 42 respectively denote a third housing and a fourth housing, which are mounted to an upper part of the first housing 22. Reference numeral 43 designates a bearing for supporting the input shaft 31. Reference numerals 44, 45 denote bearings for supporting the opposite ends of the output shaft 34.

The rack guide mechanism 50 performs two different functions. Its first function is to guide and hold the rack shaft 5 to allow transverse movement of the rack shaft 5. The second function is to urge the rack shaft 5 to bring the rack teeth 5a into meshing engagement with the pinion 4.

The rack guide mechanism 50 includes a guide member 51 for guiding the rack shaft 5 and pressing the rack teeth 5a to the pinion 4, a compression spring (resilient member) 52 for biasing the guide member 51 toward the rack shaft 5 by the resilient force thereof, an adjusting bolt 53 for adjusting the resilient force of the compression spring 52, and a lock nut 54 for locking the adjusting bolt 53 at a fixed position. The adjusting bolt 53 is threadedly received in the first housing 22.

With the resilient force adjusted by the adjusting bolt 53, the compression spring 52 presses the guiding member 51 against the rack shaft 5 with an appropriate pressing force. The rack shaft 5 is imparted with a pre-load from the guide member 51 urged by the compression spring 52. This pre-load causes the rack shaft 5 to be appropriately pressed against the pinion 4. Reference numeral 55 designates a backing member disposed between the guide member 51 and the rack shaft 5.

Figure 4:
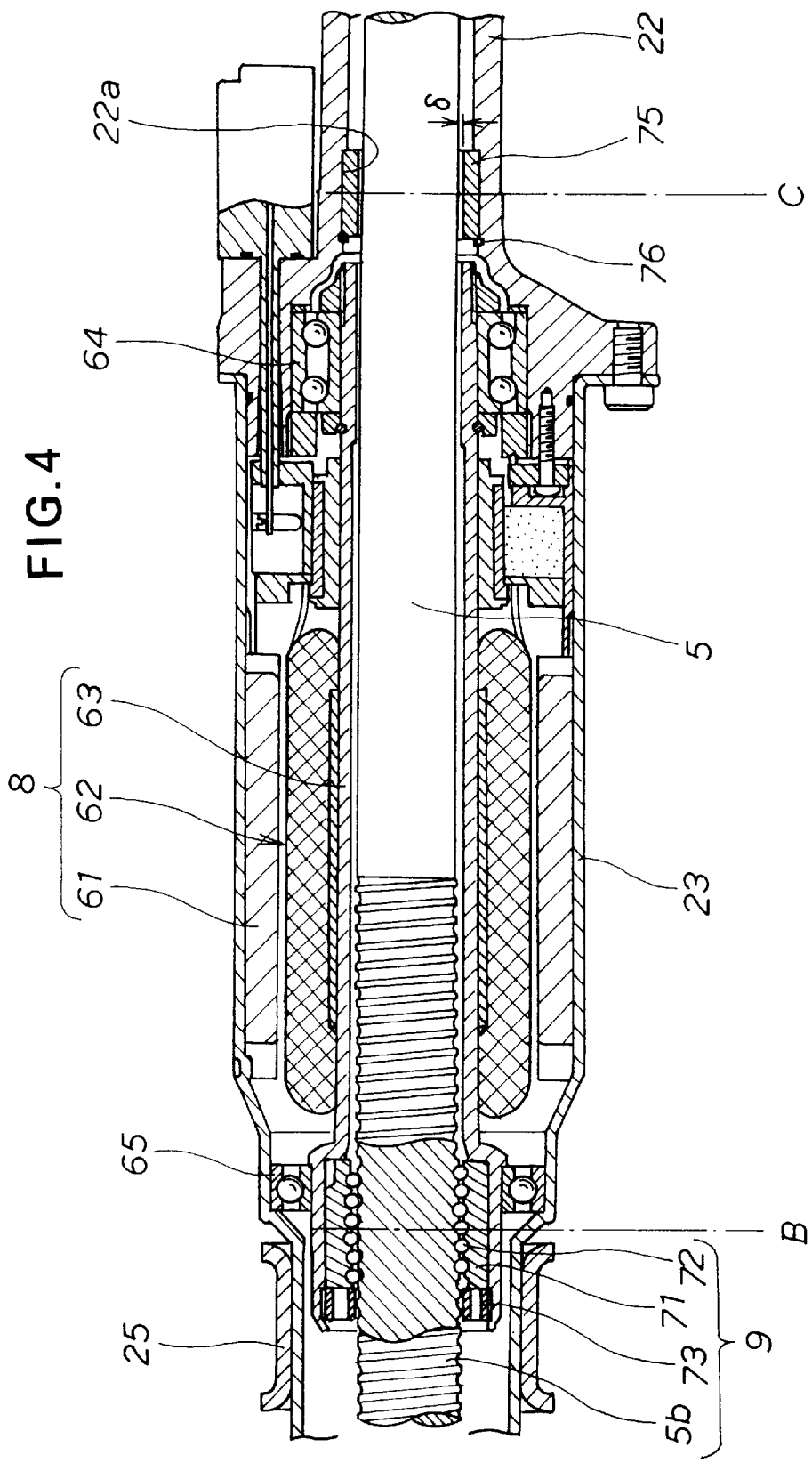
FIG. 4 is a cross-sectional view showing a rack shaft, an electric motor, a ball screw and their vicinity of the electric power steering apparatus.

FIG. 4 illustrates on an enlarged scale the rack shaft, electric motor, ball nut and their vicinities shown in FIG. 2. The electric motor 8 includes a stator 61 and a rotor 62, which are housed in the second housing 23. The rotor 62 is rotatable about the rack shaft 5 and includes a tubular output shaft 63 for allowing passage of the rack shaft 5 therethrough. The output shaft 63 has opposite ends rotatably supported within the first and second housings 22, 23 via bearings 64, 65. The ball screw 9 includes a nut 71 mounted internally of one end of the output shaft 63. The bearing 65 supports the ball screw 9 via the output shaft 63 at the ball screw center B or its vicinity.

The ball screw 9 comprises a threaded or screw portion (screw groove) 5b of the rack shaft 5, the nut 71 forming an outer cylindrical portion of the rack shaft 5, and a multiplicity of balls 72. The ball screw 9 is of the known type, such as a so-called internal- or external-circulation ball screw, wherein balls 72 arriving at a screw groove end of the nut 71 are circulated through a tube not shown, and transmits an auxiliary torque from the electric motor 8 through the nut 71 and via the balls 72 to the screw (threaded) portion 5b.

In FIG. 4, reference numeral 73 denotes a lock screw screwed into the inner surface of the output shaft 63 for preventing axial movement of the nut 71 relative to the output shaft 63.

The bush 75 is fitted into a mount opening 22a formed at one end portion of the first housing 22 and fixed by a stop ring 76 so that it may not come out of the mount opening 22a. The bush 75 is made from a self-lubricating or low frictional resistance material, for example, a fluororesin-based resin such as a tetrafluoroethylene resin (Teflon™). Between the rack shaft 5 and the bush 75, there is provided a clearance $\delta$, e.g., of the order of 0.1 mm. The bush 75 supports the rack shaft 5 at an intermediate portion (e.g., bush center C) thereof when the rack shaft 5 is bent by a predetermined value of $\delta$.

Next, the operation of the electric power steering apparatus explained above will be discussed with reference to (a) to (d) of FIG. 5.

Figure 5:
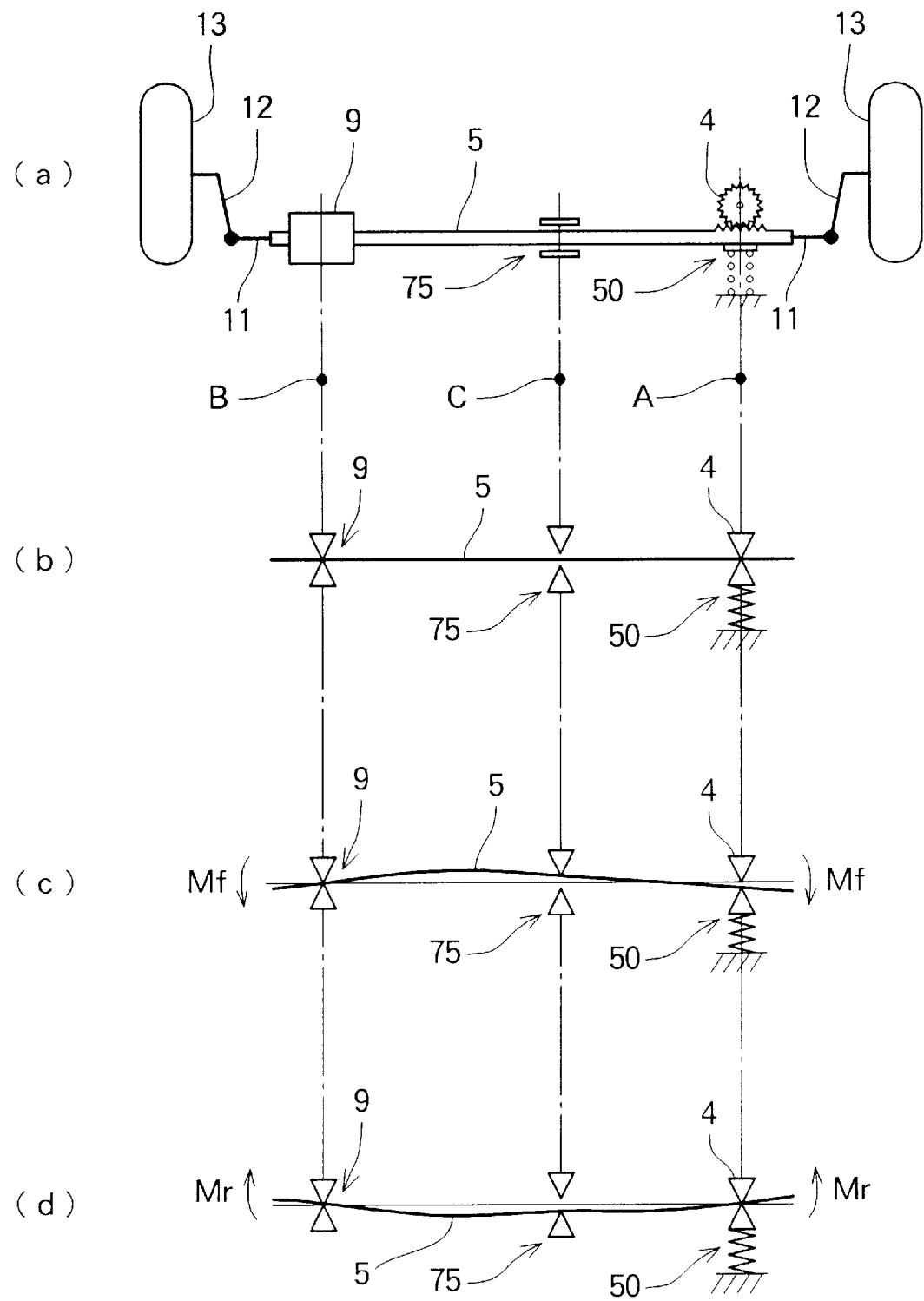
FIG. 5 is a diagrammatic view illustrating the operation of the electric power steering apparatus.

(a) of FIG. 5 is a schematic illustration of the electric power steering apparatus 1 represented by combining FIG. 1 with FIG. 2. Since all of the referenced portions have been explained in relation to FIG. 1 and FIG. 2, their explanation will be omitted.

(b) of FIG. 5 is a schematic illustration of the rack shaft 5 and its vicinity. The rack shaft 5 is supported at the pinion center A and ball screw center B and pressed against the pinion 4 by the rack guide mechanism 50 at the pinion center A.

Being assembled with the rack shaft 5, the ball shaft 9 supports the rack shaft 5 from both forward and rearward directions (vertical direction in FIG. 5) of a vehicle body. The pinion 4 supports the rack shaft 5 from the forward direction of the vehicle body. The rack guide mechanism 50 presses the rack shaft 5 against the pinion 4 from the rearward direction of the vehicle body. The bush 75 supports the rack 5 when the latter bends at the bush center C by the predetermined value.

Referring to (c) and (d) of FIG. 5, an external force or moment (hereinafter referred to as "moments Mf, Mf from the forward direction (front side) of the vehicle body" and "moments Mr, Mr from the rearward direction (back side) of the vehicle body"), resulting from the ball screw 9 and a reactive force from the road surface arising when the vehicle is running, particularly when the steering wheel is turned, is applied to the opposite ends of the rack shaft 5.

As shown in (c) of FIG. 5, when one end of the rack shaft 5 is bent away from the pinion 4 by the moments Mf, Mf from the forward direction with the intermediate portion of the rack shaft 5 flexed by the predetermined value, the rack shaft 5 is supported by the ball screw 9, bush 75 and the rack guide mechanism 50. As a result, the rack shaft 5 flexes as shown by a thick solid line in (c) of FIG. 5.

As shown in (d) of FIG. 5, when one end of the rack shaft 5 is bent to be pressed against the pinion 4 by the moments Mr, Mr from the rearward direction of the vehicle body with the intermediate portion of the rack shaft 5 flexed by the predetermined value, the rack shaft 5 is supported by the ball screw 9, bush 75, and pinion 4. As a result, the rack shaft 5 bends as shown by a thick solid line in (d) of FIG. 5.

As is apparent from the foregoing description, when the moments Mf, Mf, Mr, Mr are applied from both the rearward and forward directions of the vehicle body to the opposite ends of the rack shaft 5, the intermediate portion of the rack shaft 5 does not bend in excess of the predetermined value, because the rack shaft intermediate portion is supported by the bush 75. Since the rack shaft 5 is thus allowed to bend only a limited amount, the vibration of the rack shaft 5 can be restricted. The restriction of the rack shaft vibration further leads to the prevention of the steering wheel vibration.

Figure 6:
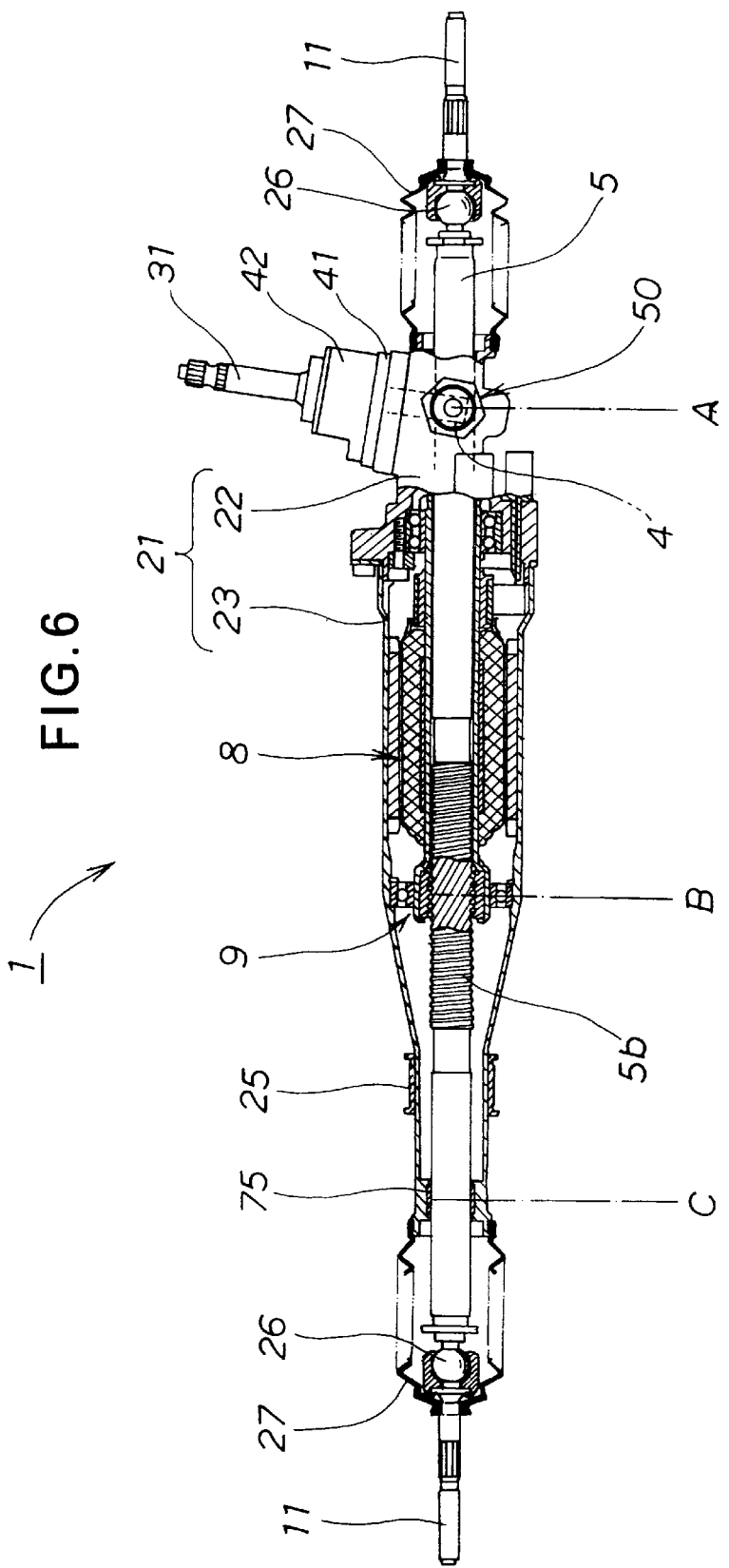
FIG. 6 is a view similar to FIG. 2 but illustrating the overall arrangement of a modification of the electric power steering apparatus.

FIG. 6 illustrates a modification of the electric power steering apparatus shown in FIGS. 1 to 5. The same or like reference numerals will be used for the corresponding parts in the embodiment of FIGS. 1 to 5 and their description will be omitted.

In the modified form of the electric power steering apparatus 1, the screw (threaded) portion 5b is provided at a portion of the rack shaft 5 displaced from the opposite end remote from the pinion 4, toward the pinion 4 at the one end of the rack shaft 5. The ball screw 9 is attached to the screw portion 5b. The bush 75 is provided at the opposite end of the rack shaft 5 for supporting the rack shaft opposite end as the rack shaft 5 is bent by the predetermined amount. In other words, the rack shaft 5 has the pinion 4 meshed with the one end thereof, bush 75 provided at the other end, and ball screw 9 assembled with the intermediate portion of the rack shaft.

Figure 7:
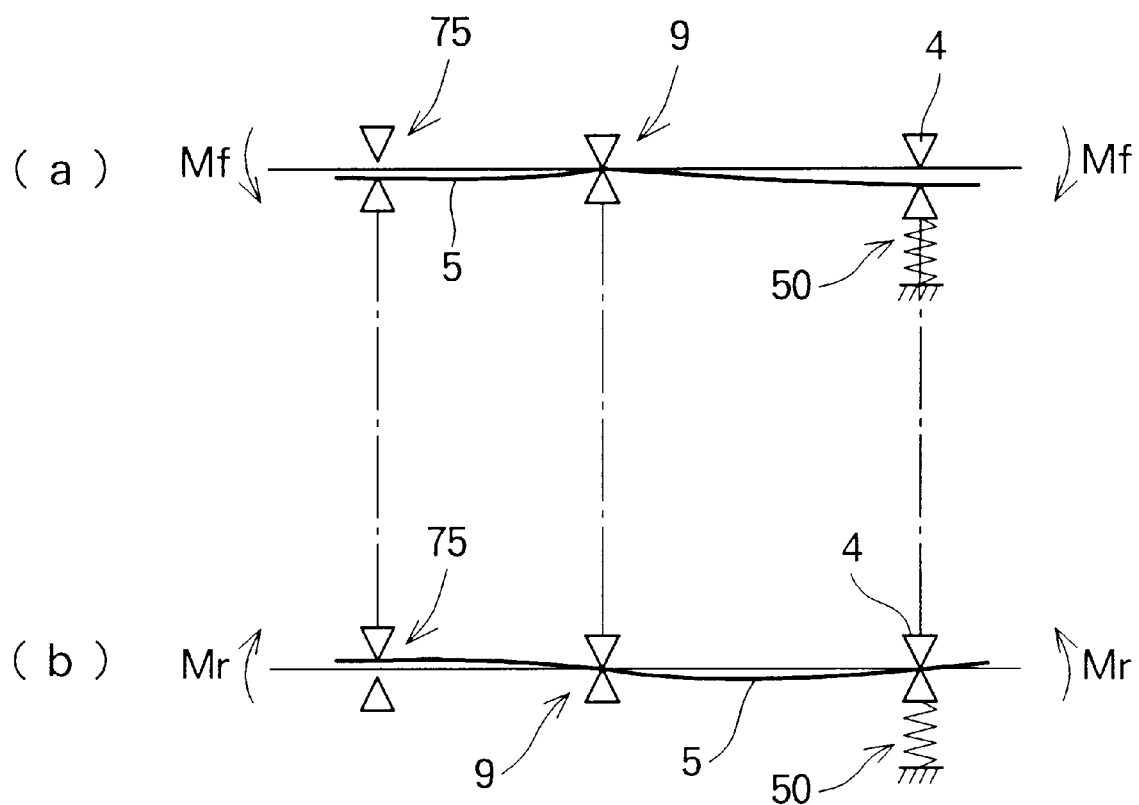
FIG. 7 is a diagrammatic view illustrating the operation of the modified electric power steering apparatus of FIG. 6.
Figure 8:
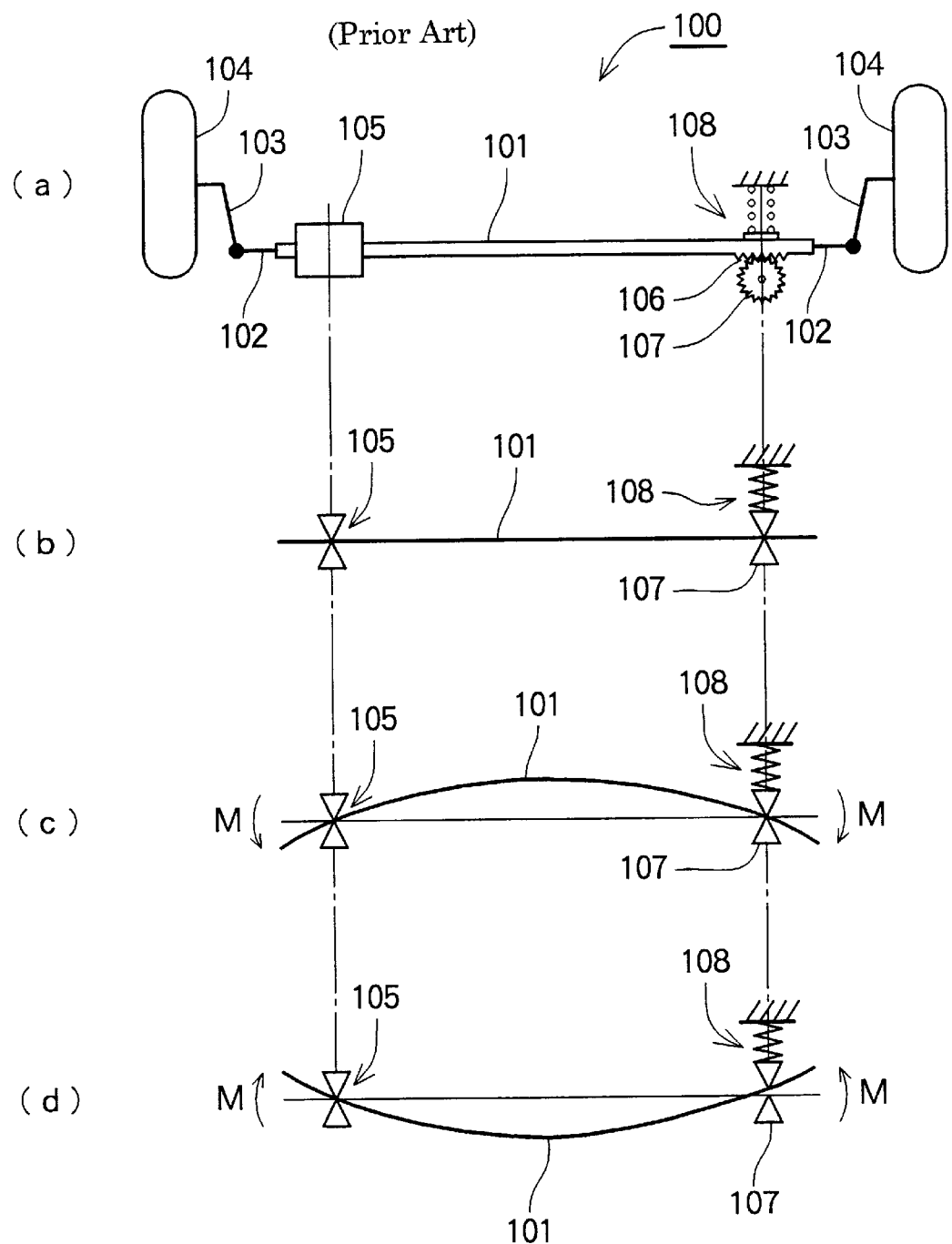
FIG. 8 is a diagrammatic illustration of a conventional electric power steering apparatus.

(a) and (b) of FIG. 7 are views similar to (c) and (d) of FIG. 5, showing the operation of the rack shaft 5 of the modified electric power steering apparatus 1.

As shown in (a) of FIG. 7, the moment Mf from the forward direction of the vehicle body causes the one end (on the right side of the figure) of the rack shaft 5 to be bent away from the pinion 4. By thus providing the bush 75, the opposite end of the rack shaft 5 is prevented from being bent in excess of the predetermined value when imparted with the moment Mf from the forward direction of the vehicle body. Stated otherwise, the rack shaft 5 is flexed at two ends with its intermediate portion held against the ball screw 9, as shown in (a) of FIG. 7. The rack shaft 5 is thus supported by the rack guide mechanism 50 and the ball screw 9.

As shown in (b) of FIG. 7, the moment Mr from the back side of the vehicle body causes the one end of the rack shaft 5 to be bent and pressed against the pinion 4. By virtue of the bush 75, the other end of the rack shaft 5 is prevented from being bent in excess of the predetermined value when imparted with the moment Mf from the front side of the vehicle body. When the moments Mr, Mr are exerted from the rearward direction of the vehicle body to the two ends of the rack shaft 5, the rack shaft 5 is supported by the bush 75, ball screw 9 and pinion 4 and thus flexes as shown by a thick solid line in (b) of FIG. 7.

As thus far explained, with the intermediate portion of the rack shaft 5 supported by the ball screw 9 and the other end supported by the bush 75, the other end of the rack shaft 5 is prevented from being bent in excess of the predetermined value when the moments Mf, Mf, Mr, Mr from the back and front sides of the vehicle body. At the same time, the intermediate portion of the rack shaft 5 is also prevented from being bent. As a result, the amount of bending of the rack shaft 5 is kept to a minimum, thereby preventing the rack shaft vibration.

Obviously, various minor changes and modifications are possible in the light of the above teaching. It is to be understood that within the scope of the appended claims the present invention may be practiced otherwise than as specifically described.

What is claimed is:

1. An electric power steering apparatus comprising:

a rack shaft having rack teeth disposed at a portion of a peripheral surface of one end thereof and a screw portion provided at an opposite end thereof;

a pinion for meshing with said rack teeth;

a rack guide mechanism provided on a back side surface of said peripheral surface, opposed from said peripheral surface portion on which said rack teeth are formed, for pressing said back side surface of said rack shaft;

a nut mounted on said screw portion;

an electric motor for applying an auxiliary torque, corresponding to a steering torque, to said rack shaft through said nut; and a bush for supporting an intermediate portion of said rack shaft to thereby restrict bending of said rack shaft in excess of a predetermined value when said rack shaft is bent by the predetermined value, wherein the bush is disposed adjacent the rack shaft such that there is provided a clearance between the rack shaft and the bush of the predetermined value.

2. An electric power steering apparatus comprising:

a rack shaft having rack teeth disposed at a portion of a peripheral surface of one end thereof and a screw portion provided at a position displaced from an opposite end toward said one end thereof;

a pinion for meshing with said rack teeth;

a rack guide mechanism provided on a back side surface of said peripheral surface, opposed from said peripheral surface portion on which said rack teeth are formed, for pressing said back side surface of said rack shaft;

a nut mounted on said screw portion;

an electric motor for applying an auxiliary torque, corresponding to a steering torque, to said rack shaft through said nut; and a bush for supporting the opposite end of said rack shaft to thereby restrict bending of said rack shaft in excess of a predetermined value when said rack shaft is bent by the predetermined value, wherein the bush is disposed adjacent the rack shaft such that there is provided a clearance between the rack shaft and the bush of the predetermined value.

* * * * *